(12) United States Patent
Beutler

(10) Patent No.: US 6,189,566 B1
(45) Date of Patent: Feb. 20, 2001

(54) LIQUID DISTRIBUTOR FOR COLUMN PACKINGS

(75) Inventor: Beat Beutler, Winterthur (CH)

(73) Assignee: Sulzer Chemtech AG, Winterthur (CH)

( * ) Notice: Under 35 U.S.C. 154(b), the term of this patent shall be extended for 0 days.

(21) Appl. No.: 09/416,127

(22) Filed: Oct. 12, 1999

(30) Foreign Application Priority Data

Oct. 28, 1998 (EP) .................................................. 98811082

(51) Int. Cl.$^7$ .................................................. F16L 15/00
(52) U.S. Cl. ................ 137/561 A; 251/118; 137/315.01
(58) Field of Search ........................ 137/561 A; 261/108, 261/115, 118

(56) References Cited

U.S. PATENT DOCUMENTS

| | | | |
|---|---|---|---|
| 3,936,262 | * | 2/1976 | Hehl .................................. 137/561 A |
| 4,586,540 | * | 5/1986 | DeLord .................................. 138/39 |
| 5,209,259 | * | 5/1993 | Dear et al. ........................ 137/561 A |
| 5,680,989 | * | 10/1997 | Plachy et al. .......................... 239/193 |

FOREIGN PATENT DOCUMENTS

| | | | |
|---|---|---|---|
| 873352 | | 5/1979 | (BE) . |
| 717907 | * | 9/1965 | (CA) ................................ 137/561 A |
| 0118029 | | 9/1984 | (EP) . |

\* cited by examiner

*Primary Examiner*—A. Michael Chambers
(74) *Attorney, Agent, or Firm*—Townsend and Townsend and Crew LLP

(57) ABSTRACT

A liquid distributor for column packings is provided for the supplying of a liquid medium which includes a material or a material mixture and which tends to the development of inhomogeneities, for example, as a result of a segregation or of a polymerization. The distributor comprises at least one submember with a row of output points for the liquid medium, with at least one of the output points assuming a last output position in the submember with respect to the flow direction of the medium. In the last output point or output points, a flow director is arranged in or at the submember through which a through-flow of the medium can be effected in regions at which a stagnation of the flow would be present without the flow director.

15 Claims, 3 Drawing Sheets

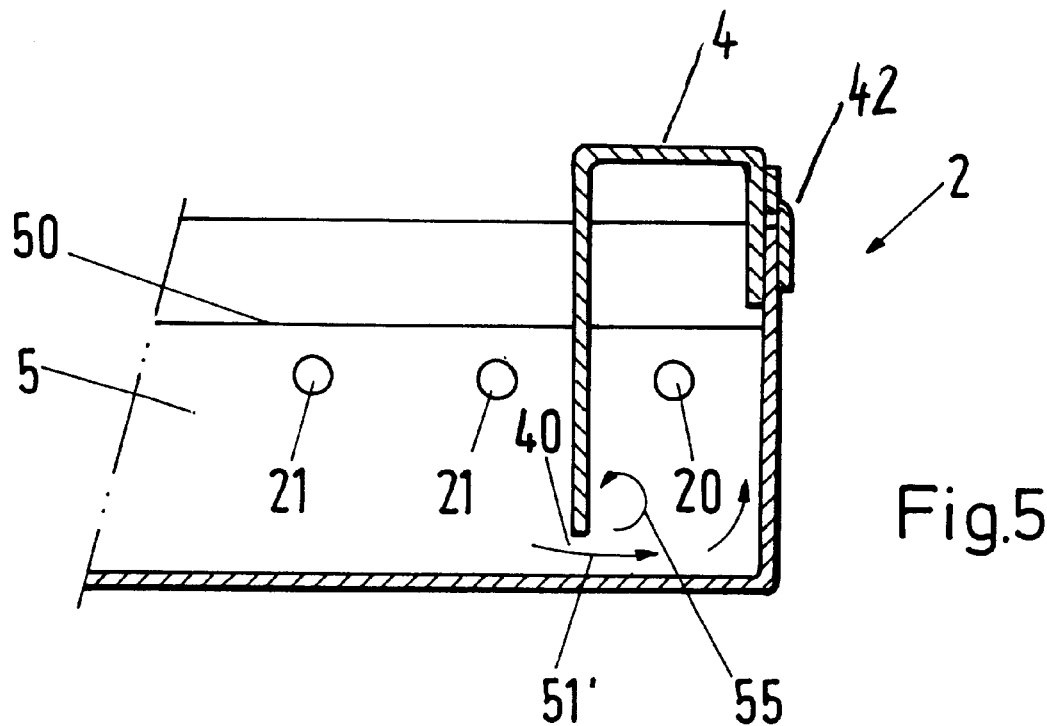
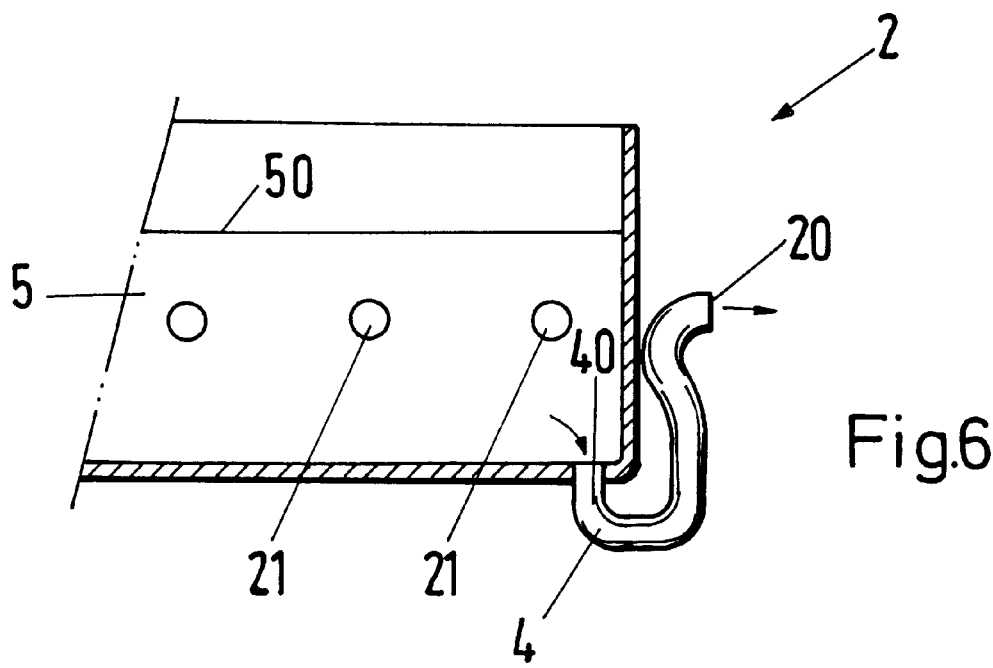

LIQUID DISTRIBUTOR FOR COLUMN PACKINGS

BACKGROUND OF THE INVENTION

The invention relates to a liquid distributor for column packings and to uses of the liquid distributor.

A liquid distributor comprises submembers with output points for the medium to be treated in the column. Submembers of this kind are arm channels, main channels, pre-distribution channels or distributor tubes. The output points are base holes, lateral holes, tubelets and/or slits. In a multiple stage liquid distributor the output points can also be the transition points from one stage to a following stage.

An apparatus for the gravimetric liquid distributor for material and heat exchange columns by means of which a liquid medium is supplied to a column packing is known from EP-B 0 118 029. The teaching of this specification relates to a uniform distribution in relation to a problem which is connected with the apparatus itself, namely a practically inevitable inclined position of the distributor system, which is as a rule slight but is nevertheless not negligible. A uniform distribution can also be impaired by properties of the medium to be treated. This is the case when the liquid medium consists of a material or a mixture of materials which tends to the development of inhomogeneities. Inhomogeneities of this kind can arise through the segregation of multiple phase media such as, for example, emulsions, through depositions from suspensions or through the polymerization of a material to be treated.

The formation of inhomogeneities is to be expected principally at locations with stagnating flow. The distributor comprises at least one submember with a row of output points for the liquid medium, with at least one of the output points taking on a last position in the submember with respect to the flow direction of the medium. In the last output point or output points there are zones with stagnating flow.

SUMMARY OF THE INVENTION

The object of the invention is to create a liquid distributor for column packings in which the named problem with the formation of inhomogeneities is defused. This object is satisfied by the distributor in that suitably designed flow directors are built into the submembers.

The liquid distributor for column packings is provided for the supply of a liquid medium which consists of a material or of a material mixture and which tends to the development of inhomogeneities, for example as a result of a segregation or of a polymerization. This distributor comprises at least one submember with a row of output points for the liquid medium, with at least one of the output points assuming a last position in the submember with respect to the flow direction of the medium. In the last output point or output points a flow director is arranged in or at the submember, through which a through-flow of the medium can be effected in regions at which a stagnation of the flow would occur without the flow directors.

Thanks to the use of flow directors in accordance with the invention the medium to be distributed is set into a state of movement in which stagnating flow zones are eliminated.

BRIEF DESCRIPTION OF THE DRAWINGS

FIG. 5 shows a distribution channel with a flow director which can be pushed on and FIG. 6 shows a distribution channel with a flow director which is at the same time an output point for the liquid to be distributed.

DESCRIPTION OF THE SPECIFIC EMBODIMENTS

Figure 1:
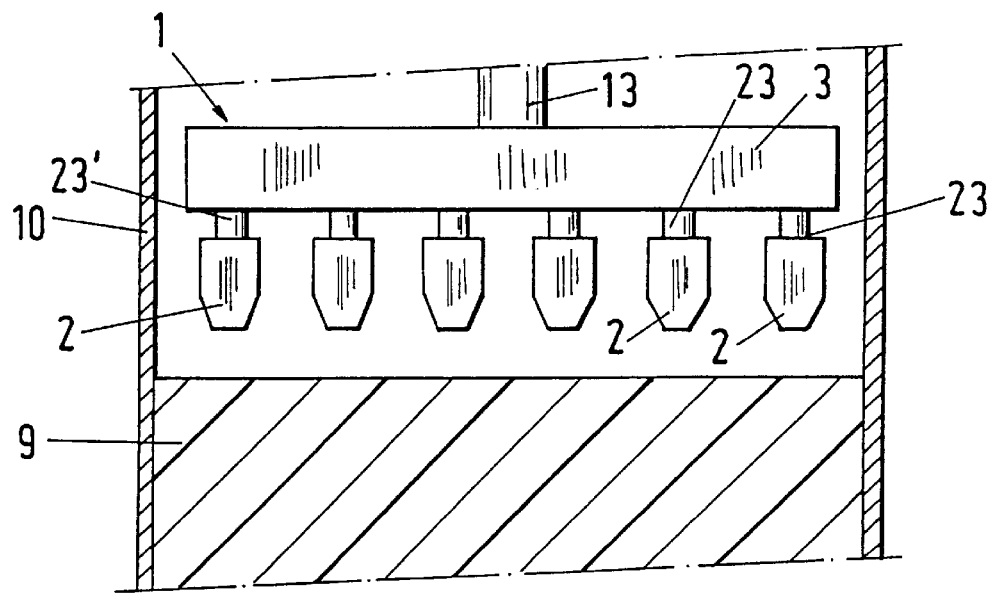
FIG. 1 shows a liquid distributor above a column packing.

FIG. 1 shows sectionally a column 10 with a packing 9, above which a two-stage distributor 1 is arranged. A liquid medium 5 to be treated on the packing 9 is supplied to the latter by means of a plurality of submembers 2—see FIG. 2. The medium 5 is fed in via a tube 13, a pre-distributor 3 and transition points 23 into the submembers 2, which are formed as distribution channels.

Figure 2:
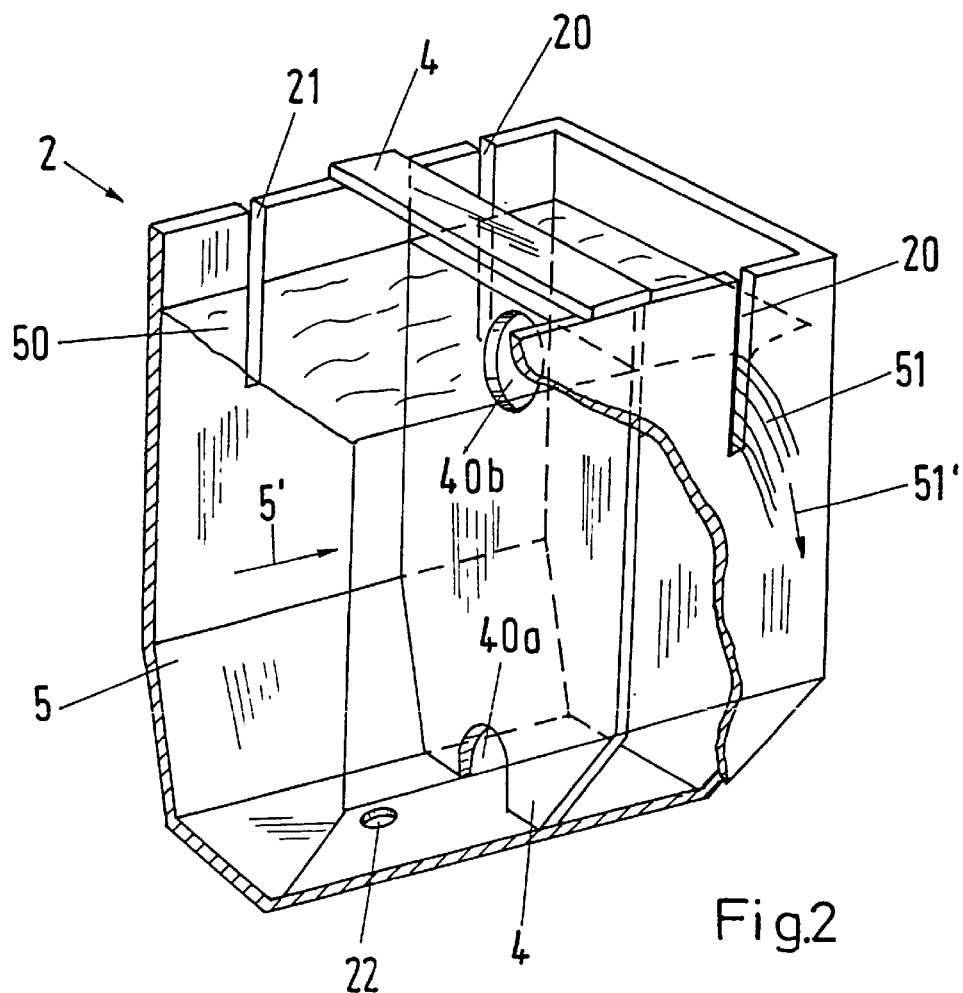
FIG. 2 an end region of a distribution channel with a flow director in accordance with the invention in the form of a baffle apparatus.

The submember 2 which is illustrated in FIG. 2—with a side wall which is removed in the drawing—is an upwardly open distribution channel; it has output points for the medium 5 which are designed as overflow slits 20, 21 at the upper channel edge and as base holes 22. The medium 5 has a liquid level 50 and flows in the direction of the arrow 5'. The medium 51 which flows out through the overflow slits (arrow 51') falls onto the non-illustrated packing 9 (see FIG. 1). The overflow slits with the reference numeral 20 are the last output points. There the movement of the medium 5 has the lowest flow speeds. A flow director 4 which is designed as a baffle apparatus provides for a directed flow in order to suppress a formation of inhomogeneities of the medium 5. This flow guiding is effected through suitably positioned apertures in the baffle apparatus, namely through a narrowing 40a, which is arranged at the base of the submember 2, and through a narrowing 40b, which is located in the region of the liquid level 50. Narrowings 40 (40a and/or 40b) of the flow director 4 can also be slit-shaped or have another geometrical form. At the edges of the narrowing 40 the flow is broken away and eddyings arise. If the narrowing 40 is located below the output point 20 then eddyings are additionally favored by the suction, which acts upwardly from below, and higher flow speeds thus result.

The flow director 4 can be welded onto the submember 2; or it can be secured in another manner, for example pinned or riveted, clamped or adhesively bonded. It can be manufactured of stainless steel, ceramic, plastic or another material. A form is chosen for the outer geometry of the flow director 4 which ideally fits into the submember 2.

Figure 3:
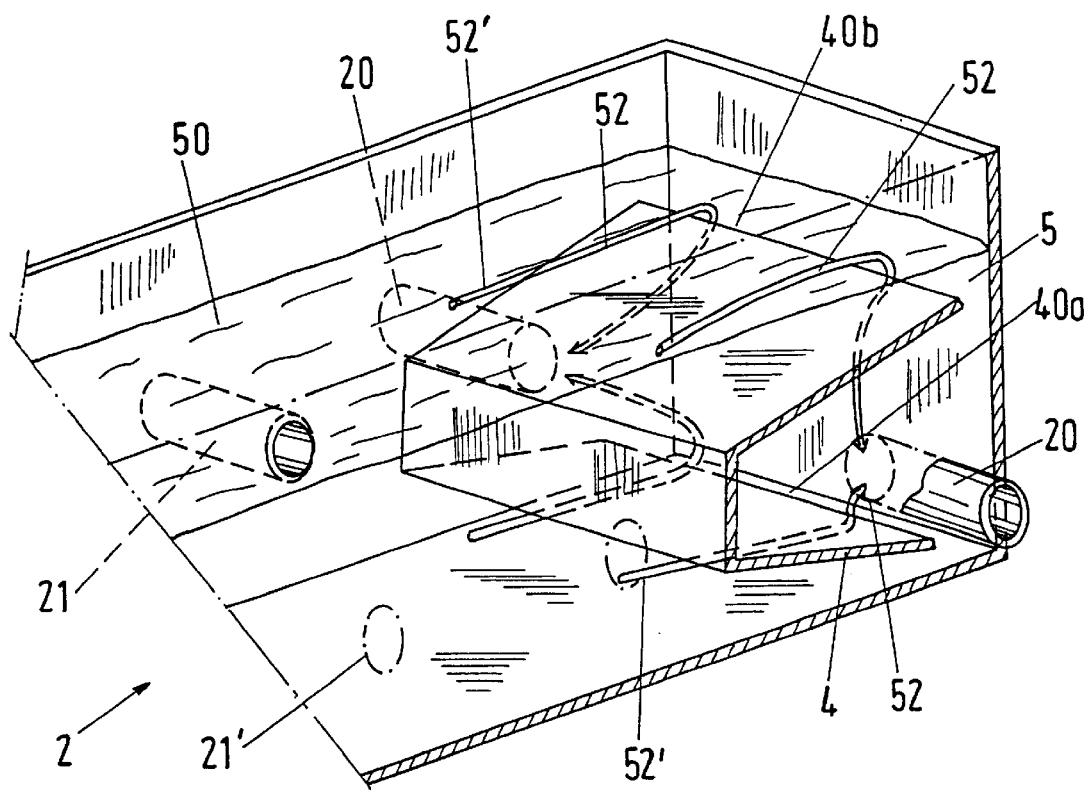
FIG. 3 shows a distribution channel with a second exemplary embodiment of the flow director.
Figure 4:
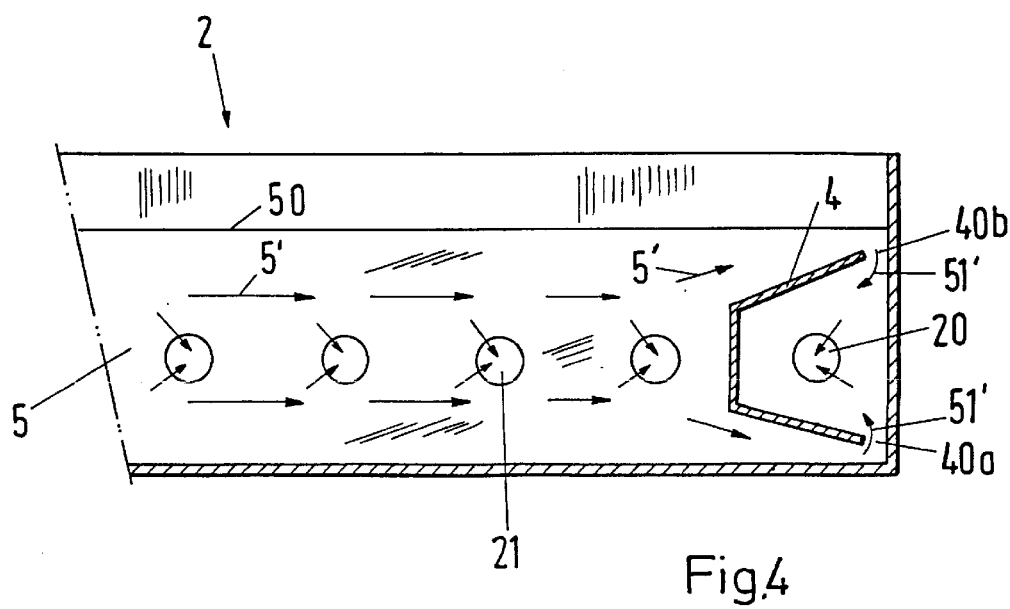
FIG. 4 shows a longitudinal section through the distribution channel of FIG. 3.

In a second embodiment of the flow director 4—see FIGS. 3 and 4—the inflow regions of the narrowings 40a and 40b are designed in the manner of nozzles. At the outflow side the narrowings have breakaway edges, through which an eddying of the outflowing medium develops. Flow filaments 52 (arrows 52') are drawn in in FIG. 3 which indicate the movement of the medium 5 in the region of the flow director 4, with however the formation of eddies not being illustrated. The medium 5 has flow speeds (arrows 5') which decrease in the direction of movement due to the outflow through the output points 20. The output points 20, 21 (also 21') are designed as tubelets.

A submember 2 in accordance with the invention is shown in FIG. 5, the flow director 4 of which is designed as an element which can be pushed into the channel formed by the submember 2 and which can be secured with a clamping part 42. The medium 5 develops eddies 55 after its passage through the narrowing 40 (arrow 51).

In the example of FIG. 6 the flow director 4 is tubular and is secured at the submember 2. The flow director 4 is itself designed here as the last output point 20.

For the two-stage distributor 1 of FIG. 1 flow directors are also advantageously provided in the pre-distributor 3 by means of which stagnating flow regions can likewise be prevented. Flow directors of this kind are arranged at the transition points 23' at the edges, through which the medium to be distributed is conducted into the submembers 2 which are positioned in last place. It is advantageous in every multiple stage distributor when flow directors are correspondingly built in into every stage.

What is claimed is:

1. A liquid distributor for column packings for supplying a liquid medium which includes a material or of a material mixture and which tends to development of inhomogeneities, the liquid distributor comprising:

at least one submember for receiving the liquid medium, the submember including a plurality of outlets for the liquid medium, the outlets including at least one last outlet assuming a last position in the submember with respect to a flow direction of the liquid medium; and a flow director disposed in the at least one last outlet for producing a through-flow of the liquid medium in regions where a stagnation of flow would be present without the flow director.

2. The liquid distributor of claim 1 wherein the flow director comprises at least one narrowing.

3. The liquid distributor of claim 2 wherein one narrowing is disposed at a location which is arranged at a low elevation in the submember.

4. The liquid distributor of claim 2 wherein one narrowing is disposed at a location which is arranged at a high elevation in the submember and in a region of a liquid level of the liquid medium.

5. The liquid distributor of claim 2 wherein at least one narrowing includes an inflow region formed as a nozzle.

6. The liquid distributor of claim 2 wherein at least one narrowing includes an outflow side having a breakaway edge through which an eddying of a flow of the liquid medium develops.

7. The liquid distributor of claim 1 wherein the submember comprises a upwardly open channel, and wherein the flow director comprises an element which is insertable into the channel.

8. The liquid distributor of claim 7 wherein the insertable element is fastenable to the channel.

9. The liquid distributor of claim 8 wherein the insertable element is fastenable to the channel by one of clamping, welding, pinning, riveting, and adhesive bonding.

10. The liquid distributor of claim 7 wherein the plurality of outlets of the channel include at least one overflow slit.

11. The liquid distributor of claim 7 wherein the last outlet of the channel comprises an overflow slit.

12. The liquid distributor of claim 7 wherein the plurality of outlets of the channel include at least one tubelet.

13. The liquid distributor of claim 7 wherein the last outlet of the channel comprises a tubelet.

14. The liquid distributor of claim 1 wherein the flow director comprises a last outlet.

15. The liquid distributor of claim 1 comprising a multi-stage distributor which includes submembers in a plurality of stages, each stage including a flow director disposed in at least one last outlet for producing a through-flow of the liquid medium in regions where a stagnation of flow would be present without the flow director.

* * * * *